G. F. SMITH.
AUTO LOCK.
APPLICATION FILED AUG. 9, 1919.
1,336,384.
Patented Apr. 6, 1920.
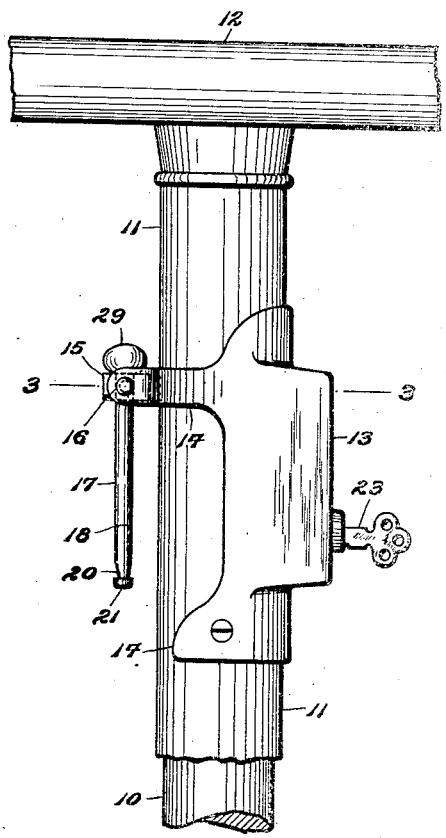
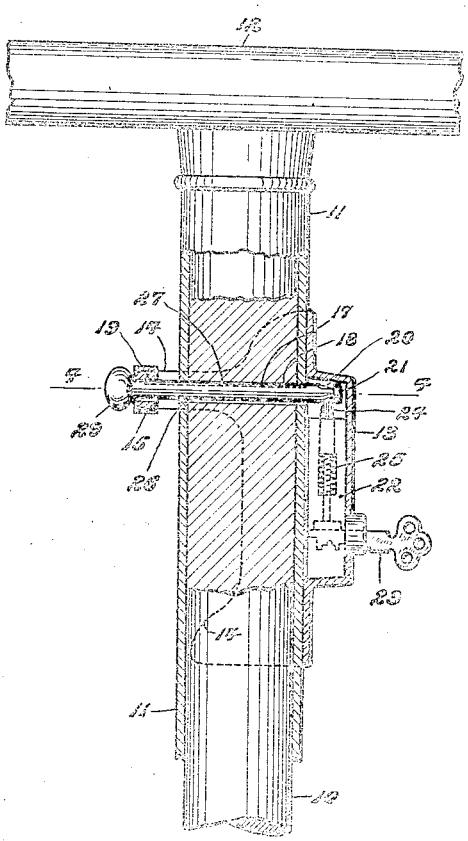
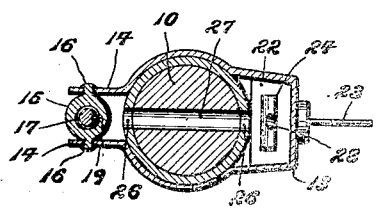
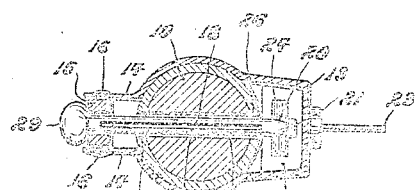
WITNESS:
Alfred T. Bratton
George F. Smith
INVENTOR,
BY
Victor J. Evans
ATTORNEY.

UNITED STATES PATENT OFFICE.

GEORGE F. SMITH, OF GERMANTOWN, PENNSYLVANIA.

AUTO-LOCK.

1,336,384.

Specification of Letters Patent.   Patented Apr. 6, 1920.

Application filed August 9, 1919.   Serial No. 316,379.

*To all whom it may concern:*

Be it known that I, GEORGE F. SMITH, a citizen of the United States, residing at Germantown, in the county of Philadelphia and State of Pennsylvania, have invented new and useful Improvements in Auto-Locks, of which the following is a specification.

An object of the invention is to provide a lock for motor vehicles, such as automobiles and the like, for the prevention of the theft thereof.

Among other features, the invention comprehends a lock which is particularly adapted to automobiles and is preferably applied to the steering post and the casing thereof whereby the post can be locked against rotation in the casing and as easily unlocked relative thereto, so as to permit of steering the vehicle when it is in operation.

In the further disclosure of the invention, reference is to be had to the accompanying drawings constituting a part of this specification, in which similar characters of reference denote corresponding parts in all the views and in which, Figure 1 is a side elevation of the device showing the same applied to the casing of a steering post, only a portion of the latter being shown, the locking pin being in unlocked position.

Fig. 2 is a vertical sectional view taken through the structure shown in Fig. 1, showing the locking pin in locking position.

Fig. 3 is a horizontal sectional view taken on the line 3—3 in Fig. 1, and

Fig. 4 is a horizontal sectional view taken on the line 4—4 in Fig. 2.

Referring more particularly to the views, the numeral 10 indicates a steering post of a motor vehicle or the like and the numeral 11, the encircling casing of the post. It is of course understood that the steering post 10 is normally rotatable in the casing 11 in order that the steering of the vehicle can be effected, the upper end of the post having the usual steering wheel 12 for accomplishing this purpose. Secured to the casing 11 is a body or housing 13 having a plurality of projecting ears 14 between which a collar 15 is mounted to turn, the collar being swiveled on suitable pins 16 projecting from the ears 14. Mounted to slide in the collar to swing therewith, is a locking pin 17, the latter preferably having a longitudinal groove 18 therein in which is accommodated a projection 19 on the collar 15, the groove 18 being closed at both ends thus preventing the entire removal of the locking pin from the collar. The locking pin 17 at its inner or free end is provided with an annular groove 20 forming an enlarged head or locking flange 21. A suitable lock 22 is arranged in the housing 13 and adapted to be operated by a suitable key 23, said lock being of any desired form of construction and including a bolt 24 which is normally held in extended or locking position by a spring 25 and is removed therefrom by the use of the key 23.

The casing 11 is provided with a plurality of diametrically opposed openings 26 and the steering post 10 has a transverse opening or passage 27 therethrough, which can be alined with the openings 26 in the casing 11 upon turning the steering post as will be readily understood. The openings 26 and transverse passage 27 are substantially in line with the mounting on the locking pin 17 and when the structure is in the position shown in Fig. 1, and it is desired to lock the steering post relative to the casing 11, the locking pin 17 is slid on the collar 15 so that the locking pin can be swung from its normal unlocked vertical position to a horizontal position with the inner end of the locking pin alining with the openings 26 and transverse passage 27, after which the locking pin is pushed through these openings and the passage, causing its inner end to engage with the bolt 24 which latter is provided with a notched out portion 28 adapted to partially encircle the pin in the groove 20 thus locking the locking pin against removal. It will now be seen that the steering post will be locked relative to the casing and cannot be rotated until the key 23 is applied to the lock 22 to retract the bolt 24, releasing the inner end of the locking pin so that it can be withdrawn from connection with the steering post and the casing and then swung back into its vertical position and drop to lie alongside of the casing, the head 29 of the locking pin serving to prevent its removal from the collar 15 when the pin is in normal unlocked position as shown in Fig. 1.

From the foregoing description it will be seen that the device described is of a simple construction, consists of few parts that cannot readily get out of order and by having the lock disposed upon the steering post casing in close proximity to the driver, the same can be easily and quickly operated by him to accomplish the desired result.

Having described my invention, I claim—

1. A lock for a post and the encircling casing thereof, said post normally rotatable in the casing and provided with a transverse passage which in the rotation of the post is movable into or out of registration with opposed openings in the casing, comprising a housing on the casing, a lock in the housing and a locking pin mounted to swing and to slide on a portion of the housing and normally disposed to lie exteriorly of the casing, said locking pin being adapted to be swung from a normally vertical position into a horizontal position and projected through the registered openings and transverse passage in the casing and post to have an end of the locking pin engaged with the lock in the housing.

2. A means for locking a post relative to the casing thereof, said post having a transverse passage which in the operation of the post can be brought into registration with openings in the casing, comprising a locking pin mounted to swing and to slide and normally disposed exteriorly of the casing, said pin being movable into a position at right angles to its normal position to aline with the openings in the casing and the passage in the post and be projected through said openings and said passage to lock the post relative to its casing.

3. A means for locking a post relative to the casing thereof, said post having a transverse passage which in the operation of the post can be brought into registration with openings in the casing, comprising a locking pin mounted to swing and to slide and normally disposed exteriorly of the casing, said pin being movable into a position at right angles to its normal position to aline with the openings in the casing and the passage in the post and be projected through said openings and said passage to lock the post relative to its casing and a locking mechanism disposed exteriorly of the casing and adapted to be engaged by a projecting end of the locking pin after the latter passes through the casing and the post to lock said pin against removal from its locking position.

In testimony whereof I affix my signature.

GEORGE F. SMITH.